$BaTiO_3 + x\% \ Y_2O_3$
A. $x = 10\%$
B. $x = 7\frac{1}{2}\%$
C. $x = 5\%$

United States Patent Office 3,496,433
Patented Feb. 17, 1970

3,496,433
YTTRIA MODIFIED BARIUM TITANATE CAPACITOR
Paul F. Siegrist, Williamstown, Mass., assignor to Sprague Electric Company, North Adams, Mass., a corporation of Massachusetts
Filed Jan. 3, 1966, Ser. No. 518,224
Int. Cl. H01g 1/00, 1/14
U.S. Cl. 317—258    3 Claims

ABSTRACT OF THE DISCLOSURE

A uniform dielectric constant ceramic of a fired combination of barium titanate and about 7–12% yttrium oxide.

---

This invention relates to ceramic barium titanate having an extremely uniform dielectric constant over a broad range of temperatures.

There is no standard ceramic dielectric; each one is specially formulated to suit a particular application. The present invention has for its primary object the formulation of a ceramic dielectric which has its temperature coefficient of dielectric constant controlled within very narrow limits.

Figures 1, 2:
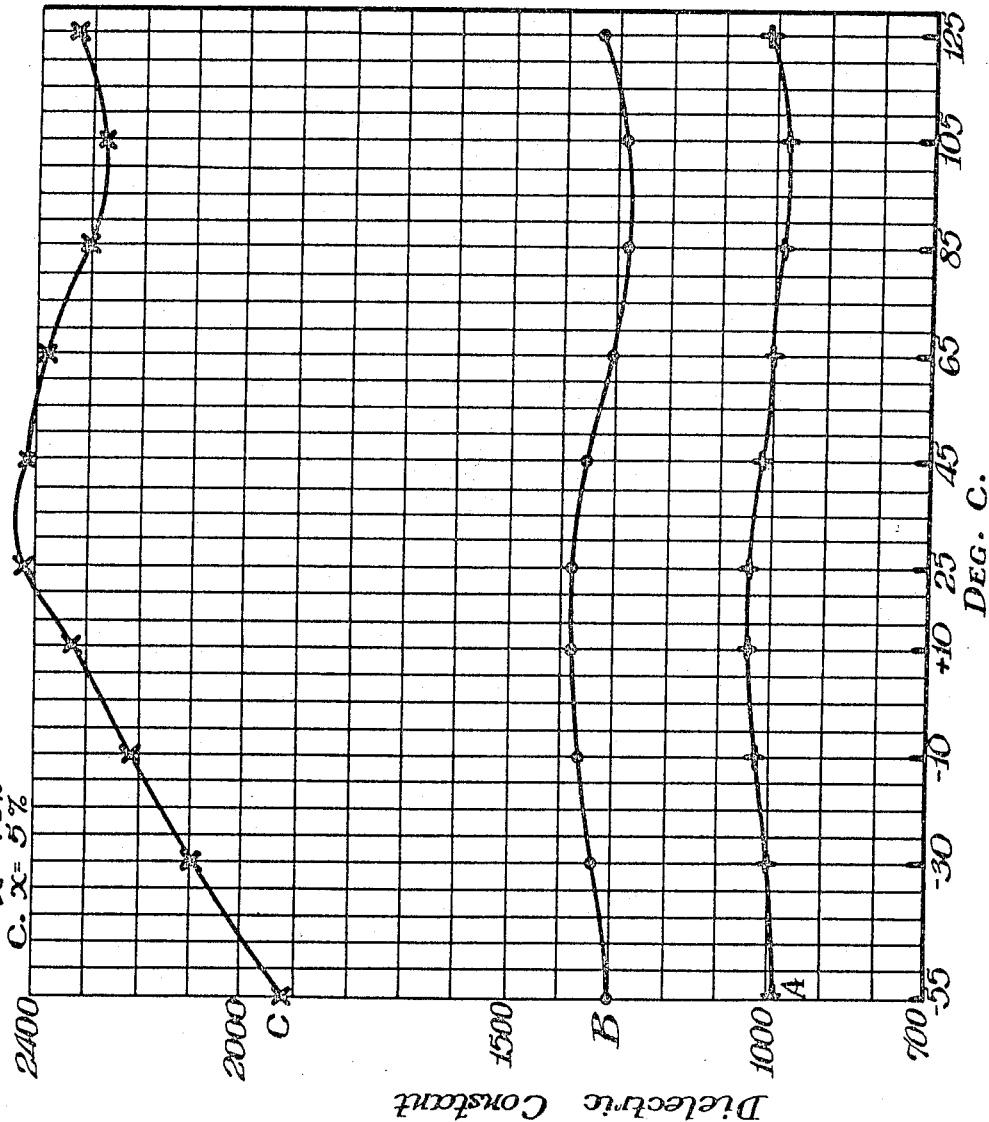
FIGURE 1 is a plot of the percentage change in dielectric constant of two formulations within the scope of the present invention as compared with a third formulation.
FIGURE 2 is a side view in section of a ceramic capacitor employing the dielectric of the present invention.

The object of the present invention has been achieved by the addition of from 7–12% of yttrium oxide ($Y_2O_3$) to barium titanate.

200 grams of commercial $BaTiO_3$ powder and 20 grams of powdered yttrium oxide were slurried with water and mixed in a porcelain ball mill with porcelain balls. The mixture was milled for 8 hours and then pan dried in an oven. A paraffin binder was intimately mixed therewith. The blend was forced through a 40 mesh screen and the material retained on a 100 mesh screen was employed herein. This powder was pressed in a standard pill-making machine to form discs which would fire down to discs of $9/16''$ diameter and about .020'' thick. The discs were placed into an electric furnace, the temperature raised to 2630° F. over a period of 5 hours and held there for 1 hour to accomplish sintering of the discs. Silver electrodes were fired on the opposing faces of 12 discs.

The ceramic capacitor discs of the above formulation had an average dielectric constant of about 1000 over the range −55° C. to +125° C. This value does not vary more than +4.5% or −2% over the temperature range of −55° to +125° C., see curve A of FIGURE 1. The dissipation factor is 1.0% at 25° C., with a maximum of 1.6% at −55° C.

The ceramic capacitor discs of the above formulation have an average dielectric constant of about 1045 at 25° C. At −55° C. this drops to a value of only 990 and at 105° C. and 125° C. it drops to 980 and 1010 respectively, see curve A of FIGURE 1.

Using the same procedure a second group of 12 capacitor discs were formed having 7½% yttrium oxide therein. As shown by curve B, these units have an average dielectric constant of about 1380 and 25° C. This value drops to only 1300 at −55° C. and at about 105° C. and 125° C. to 1280 and 1330 respectively.

A third formulation containing 5% yttrium oxide was prepared in the same manner. As shown by curve C, these units have an average dielectric constant of about 2420 at 25° C. This value drops significantly to 1930 at −55° C. and to about 2270 and 2330 at 105° C. and 125° C. respectively.

These examples illustrate clearly the efficacy of yttrium oxide in flattening the TC curve of a barium titanate ceramic when the yttrium oxide is present within a range of about 7–12%. At percentages less than this, the variation in dielectric constant over the range −55° C. to 125° C. is considerable. Circuits containing capacitors employing the dielectric of curve C would have to be designed with far greater tolerances than circuits employing curve A or B type capacitors. In other words, by the use of A or B type dielectrics, one significant variable has been, for all practical purposes, eliminated.

FIGURE 2 illustrates a conventional ceramic capacitor 10 utilizing a disc 11 of ceramic dielectric of the present invention. On opposite side of the disc are silver electrodes 12 and 13.

While the present invention has been illustrated by means of modifying a commercial barium titanate (i.e. $BaTiO_3$) containing up to 2% alkali and/or alkaline earth metal oxides) it is to be understood that pure barium titanate may also be modified. Furthermore, barium titanate containing conventional prior art additives designed to improve certain characteristics can also be employed herein.

The foregoing examples are presented for purposes of illustration and are not intended to limit the instant invention. Various changes and modifications, obvious to those skilled in the art may be made without departing from the scope of the invention.

What is claimed is:
1. A ceramic capacitor comprising a pair of electrodes separated by a dielectric ceramic composition consisting essentially of a fired combination of barium titanate and from about 7–12% yttrium oxide.
2. The capacitor of claim 1 wherein said composition contains 7½% yttrium oxide.
3. The capacitor of claim 1 wherein said composition contains 10% yttrium oxide.

References Cited

UNITED STATES PATENTS

| | | | |
|---|---|---|---|
| 2,616,813 | 11/1952 | Klasens | 106—39 |
| 2,735,024 | 2/1956 | Kulcsar | 106—46 X |
| 2,985,700 | 5/1961 | Johnston | 106—39 X |

FOREIGN PATENTS 755,860  8/1956  Great Britain.

OTHER REFERENCES

Sauer, H. A. and Fisher, J. R.: Processing of Positive Temperature Coefficient Thermistors, in Journ. Amer. Cer. Soc., 43, 1960, pp. 297–301.

HELEN M. McCARTHY, Primary Examiner
W. R. SATTERFIELD, Assistant Examiner

U.S. Cl. X.R.
106—39; 252—63.5